United States Patent
Brodeur et al.

(10) Patent No.: US 11,469,039 B2
(45) Date of Patent: Oct. 11, 2022

(54) EXPANDABLE TURRET FOR ELECTRICAL EQUIPMENT

(71) Applicant: Hitachi Energy Switzerland AG, Baden (CH)

(72) Inventors: Samuel Brodeur, Varennes (CA); Mattias Viksten, Ludvika (SE); Glenn Stromberg, Ludvika (SE); John Tillery, Ludvika (SE)

(73) Assignee: Hitachi Energy Switzerland AG, Baden (CH)

( * ) Notice: Subject to any disclaimer, the term of this patent is extended or adjusted under 35 U.S.C. 154(b) by 174 days.

(21) Appl. No.: 16/844,364

(22) Filed: Apr. 9, 2020

(65) Prior Publication Data
US 2021/0319948 A1    Oct. 14, 2021

(51) Int. Cl.
*H01F 27/40* (2006.01)
*H01F 27/14* (2006.01)
*H01H 33/55* (2006.01)

(52) U.S. Cl.
CPC .......... *H01F 27/402* (2013.01); *H01F 27/14* (2013.01); *H01F 2027/404* (2013.01); *H01H 33/555* (2013.01)

(58) Field of Classification Search
CPC .. H01F 27/402; H01F 27/14; H01F 2027/404; H01H 33/555
USPC .......................................................... 361/38
See application file for complete search history.

(56) References Cited

U.S. PATENT DOCUMENTS

| | | | | |
|---|---|---|---|---|
| 3,633,141 A | * | 1/1972 | Ristuccia | H01H 85/042 337/224 |
| 3,914,528 A | * | 10/1975 | Johnson | F16K 37/0033 174/11 R |
| 7,902,950 B2 | | 3/2011 | Yang et al. | |
| 10,811,180 B1 | * | 10/2020 | Basore | H01F 27/14 |
| 2008/0121162 A1 | * | 5/2008 | Erstad | B63J 99/00 114/230.12 |
| 2009/0072940 A1 | * | 3/2009 | Yang | H01F 27/14 336/57 |
| 2014/0266529 A1 | * | 9/2014 | Kendrick | H01F 27/00 336/105 |

FOREIGN PATENT DOCUMENTS

| | | | | |
|---|---|---|---|---|
| FR | 2080195 A5 | | 11/1971 | |
| JP | S53146021 U | * | 11/1978 | ............. H01F 27/04 |
| JP | S53146021 U | | 11/1978 | |
| JP | S61128505 A | | 6/1986 | |
| JP | H0385702 A | | 4/1991 | |
| JP | H0513020 U | | 2/1993 | |

OTHER PUBLICATIONS

Petersen, Arne et al. "Guide for Transformer Fire Safety Practices", Working Group A2.33, CIGRE Jun. 2013, 139 pgs.
International Search Report and Written Opinion of the International Searching Authority, PCT/EP2021/053069, dated May 12, 2021, 12 pages.

* cited by examiner

*Primary Examiner* — Yemane Mehari
(74) *Attorney, Agent, or Firm* — Sage Patent Group

(57) ABSTRACT

A rupture reduction system for fluid-immersed electrical equipment includes a turret for mounting of a bushing. The turret is expandable in volume in response to a surge in pressure of the fluid in the turret. The expansion volume can be provided by an expandable section of the turret, which may include a bellows.

24 Claims, 3 Drawing Sheets

EXPANDABLE TURRET FOR ELECTRICAL EQUIPMENT

TECHNICAL FIELD

The present invention generally relates to electrical equipment subject to pressure surges, and more particularly, to an expandable turret for such electrical equipment.

BACKGROUND

Electrical equipment may be filled with a fluid to provide insulation or cooling, such as oil-immersed transformers. Such transformers include windings and connections that are submerged in the fluid in a tank, and provide electrical current through conductors insulated by a bushing mounted to a turret of the tank.

Certain operating conditions may create internal arcing in the turret due to an abnormal voltage from, for example, an internal fault, lightening, or vandalism. Other conditions may also create an internal surge in energy, such as overheating of components. This internal surge in energy may create a pressure surge that ruptures the turret, which leaks the fluid and may result in a fire.

While prior attempts have been made to address internal arcing in the turret by attempting to reduce the occurrence of arcing, these attempts suffer from various drawbacks, including being ineffective, costly, and/or requiring substantial modifications and additions to the components internal to the turret. Therefore, further improvements in this area are needed.

SUMMARY

One embodiment of the present disclosure is a unique system for reducing the occurrence of a rupture of a bushing turret for a transformer tank in response to a pressure surge in the bushing turret due to internal arcing or other issue. Other embodiments include apparatuses, systems, devices, hardware, methods, and combinations for transformer tank bushing turret rupture reduction/prevention. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
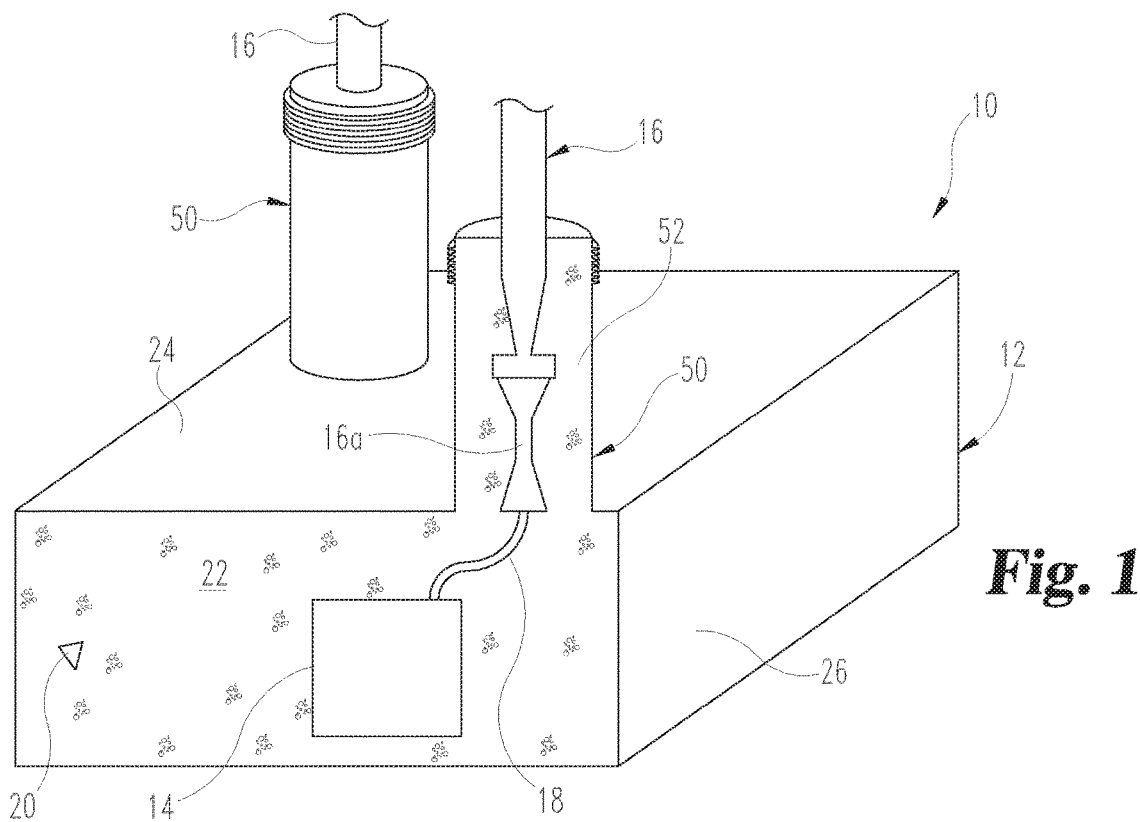
FIG. 1 is a section view showing one embodiment of a rupture reduction system for a bushing turret of a transformer.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. While illustrative embodiments of the invention are described below, in the interest of clarity, not all features of an actual implementation of the invention may be described herein.

Referring to FIG. 1, in the illustrative embodiment, a rupture reduction system 10 is shown in which fluid-immersed electrical equipment 14 is provided in a tank 12. In one embodiment, the rupture reduction system 10 is part of a transformer or shunt reactor system, and the electrical equipment 14 includes windings and/or other electrical equipment that is immersed in an insulating fluid 20, such as oil or gas. In another embodiment, the tank 12 and electrical equipment 14 could be a cable box.

System 10 may include one or more expandable turrets 50 mounted to tank 12. A bushing 16 may be mounted to each of the turrets 50. The number of turrets and bushings mounted to tank 12 may, for example, generally corresponding with the number of phases of the electrical equipment 14. It is further contemplated that a bushing may be mounted to each end of the turret 50, or that the bushing is mounted at a location other than one of the ends of the turret 50. Fluid 20 may be provided in an internal space 22 of tank 12 and in an internal volume 52 of turret 50. Fluid 20 surrounds the internal part 16a of bushing 16. Internal part 16a extends at least into internal volume 52 of turret 50 and, in some embodiments, may extend at least partially into internal space 22 of tank 12.

Figure 2:
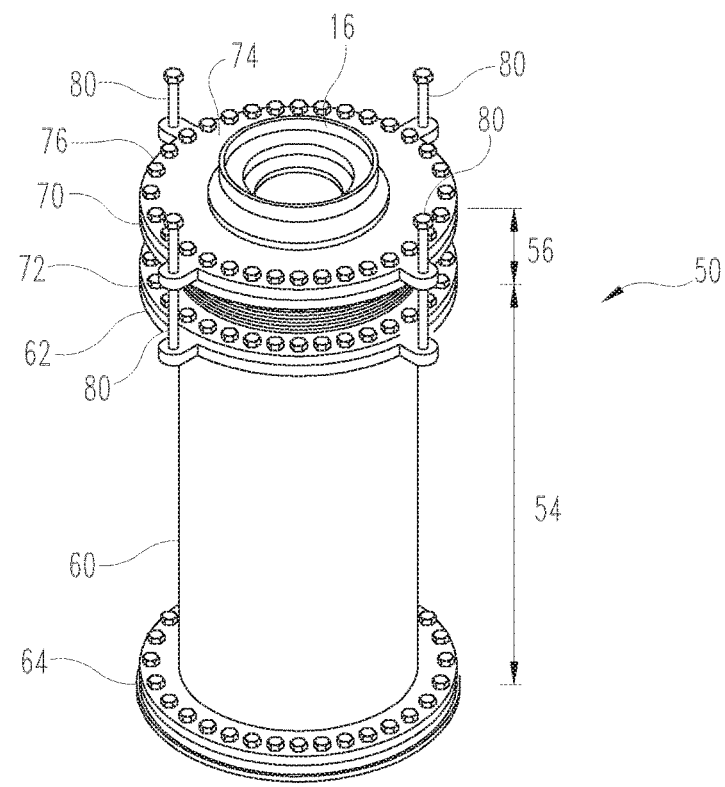
FIG. 2 is a perspective view of one embodiment of a bushing turret having an expandable volume.

Referring further to FIG. 2, one embodiment of turret 50 is shown which is expandable in volume in response to a pressure surge in fluid 20 in internal volume 52 of turret 50. In particular, internal arcing in turret 50 creates a rapid pressure rise in the fluid 20 in the internal volume 52. Since the internal volume 52 is substantially smaller than the volume of internal space 22 of tank 12, the sudden pressure rise is greater in turret 50 than in tank 12, and can cause rupture of the wall of turret 50. For example, the internal space 22 may contain a volume of fluid 20 that is at least twice as great as the volume of fluid in internal volume 52 of turret 50. Therefore, the internal volume 52 of turret 50 is expandable in response to the pressure rise of fluid 20 therein to reduce the occurrence of ruptures of turret 50.

In the illustrated embodiment, turret 50 includes a fixed length section 54 and an expandable section 56 that provides the expansion volume of turret 50. It is contemplated that expandable section 56 may expand in width and/or length to provide the expansion volume. The expandable volume can be provided by a bellows 66 as illustrated, or other suitable expandable volume type of structure. In one embodiment, the expandable section 56 is made from a material that is more ductile than the material to fixed length section 54. For example, expandable section 56 can be made from a stainless steel material, and fixed length section 54 can be made from standard structural steel or any other suitable material. Expandable section 56 may also be made from high strength structural steel material and/or standard structural steel.

Fixed length section 54 includes a cylindrical tube or pipe 60 extending between a first turret flange 62 at a first end thereof and a second turret flange 64 at an opposite second end thereof. In the illustrated embodiment, the turret 50 includes a circular cross-sectional shape, but other cross-sectional shapes are also contemplated. The combination of the fixed length section 54 and the expandable section 56 should include structural properties that are sufficient to support the load of bushing 16 on tank 12 and to maintain that support during long-term operation of the electrical equipment 14.

Figure 3B:
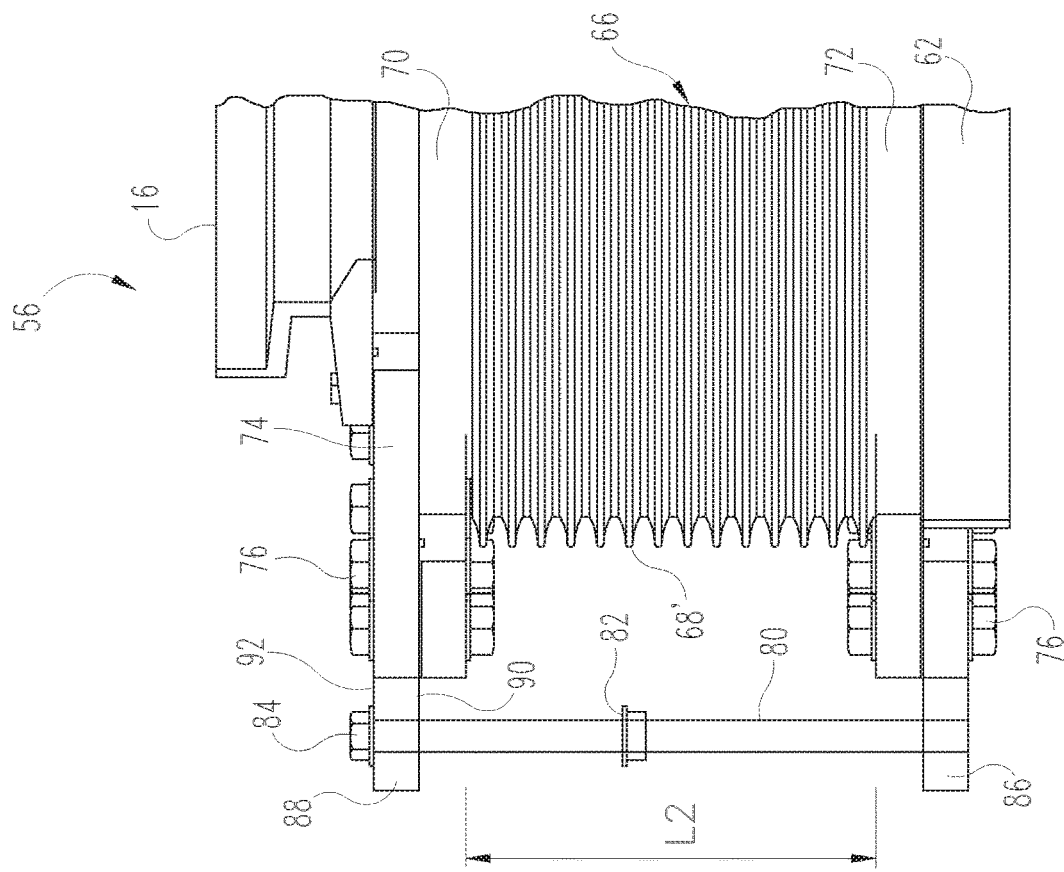
FIGS. 3A and 3B are section views showing a part of one embodiment of a bellows for providing an expandable volume of the bushing turret.
Figure 3A:
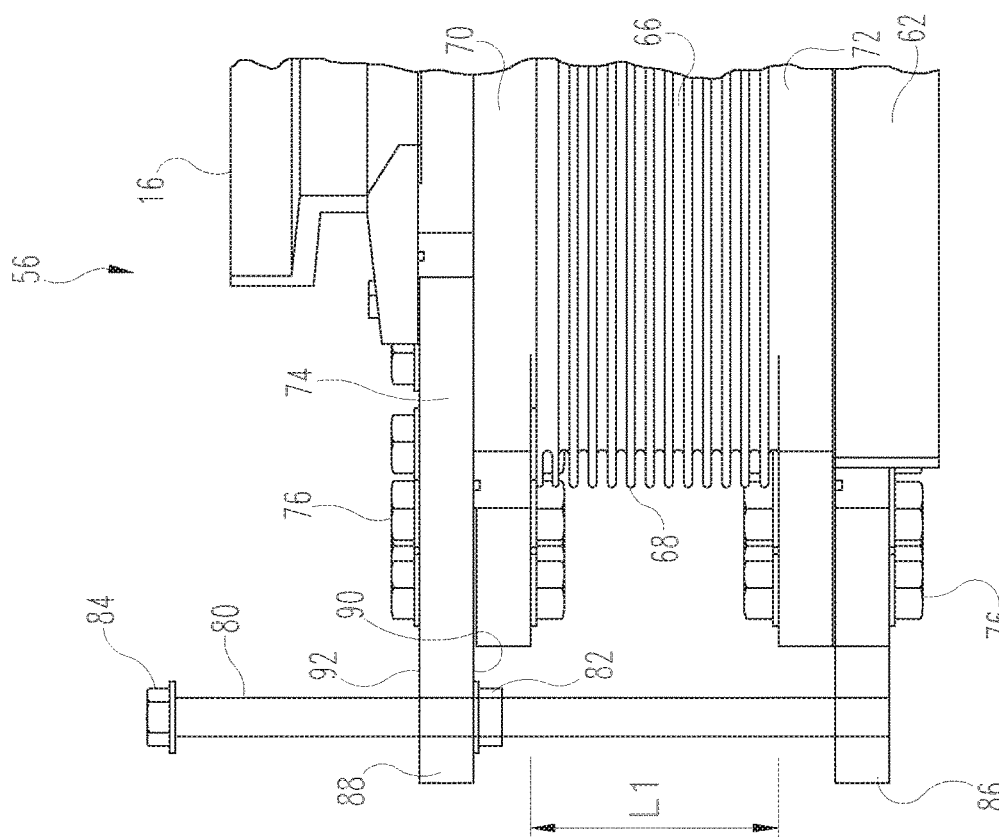

Referring further to FIGS. 3A and 3B, one embodiment of the expandable section 56 includes bellows 66 having a corrugated sidewall 68 extending between a first end flange 70 and a second end flange 72. The first and second end flanges 70, 72 are circular in shape and include holes to receive bolts 76 to secure the end flanges 70, 72 to adjacent structures. Other embodiments contemplate other shapes and/or fastening arrangements for the bellows 66 and/or end flanges 70, 72.

The sidewall 68 of bellows 66 may include a number of V-shaped or U-shape wall segments that can collapse of fold against one another with bellows 66 in the compressed condition, as shown by sidewall 68 in FIG. 3A. In the compressed condition, bellows 66 includes a length L1 between end flanges 70, 72. Sidewall 68 can unfold or separate as bellows 66 is expanded, as shown by sidewall 68' in FIG. 3B. In the expanded condition, the volume of bellows 66 is increased by the length being extended from length L1 to a greater length L2. The difference between length L2 and length L1 can be sized so that the volume provided by the expandable section 56 can accommodate the anticipated pressure surge in fluid 20 in response to, for example, internal arcing in turret 50.

In FIGS. 2, 3A and 3B, second end flange 72 of bellows 66 is mounted to first turret flange 62 with fasteners 76. Second turret flange 64 is mounted to a top wall 24 of tank 12 as shown in FIG. 1, or to an intervening structure attached to tank 12. In other embodiments, turret 50 and/or bellows 66 may be mounted to one of the sidewalls of tank 12, such as sidewall 26.

In addition, first end flange 70 of bellows 66 can be mounted to a bushing flange 74 of bushing 16. As bellows 66 expands, the bushing 16 is displaced vertically with the vertical movement of bellows 66. The flexible connection provided by conductors 18 with electrical equipment 14 provides sufficient slack to allow displacement of bushing 16 in response to the bellows expansion without disconnecting the conductors 18.

In one embodiment, one or more guide rods 80 are provided that extend along and guide the displacement of expandable section 56 between the compressed and expanded conditions. Guide rods 80 may be positioned at equally spaced intervals about the perimeter of bellows 66. In FIG. 2, there are shown four guide rods 80, but other embodiments contemplate fewer than four guide rods 80, or more than four guide rods 80. Guides rods 80 may also assist in maintaining the alignment of bushing 16 with the fixed length section 54 of turret 50 during normal operation and/or during and after movement of the bellows 66 in response to a pressure surge event, resisting lateral bending or flexing of the bellows 66.

Each of the guides rods 80 is fixed to one of the flanges 62, 74. For example, in FIGS. 3A and 3B, the guide rod 80 is fixed to a first tab 86 extending from first turret flange 62. Guide rod 80 extends axially along bellows 66 through a second tab 88 extending from bushing flange 74. In other embodiments, the guide rod 80 could be fixed to bushing flange 74 and movable along first turret flange 62. In other embodiments, the guide rods 80 could be connected to one or both of the bellows end flanges 70, 72.

In the collapsed condition of bellows 66, the guide rod 80 includes a first stop member 82 that contacts a first, bottom or lower side 90 of bushing flange 74. The first stop member 82 prevents settling during normal operation to maintain a constant minimum volume for turret 50. In the expanded condition, the guide rod 80 includes a second stop member 84 that contacts a second, top or upper side 92 of bushing flange 74. The second stop member 84 prevents overexpansion of bellows 66 in response to the pressure surge event in fluid 20.

Figure 4:
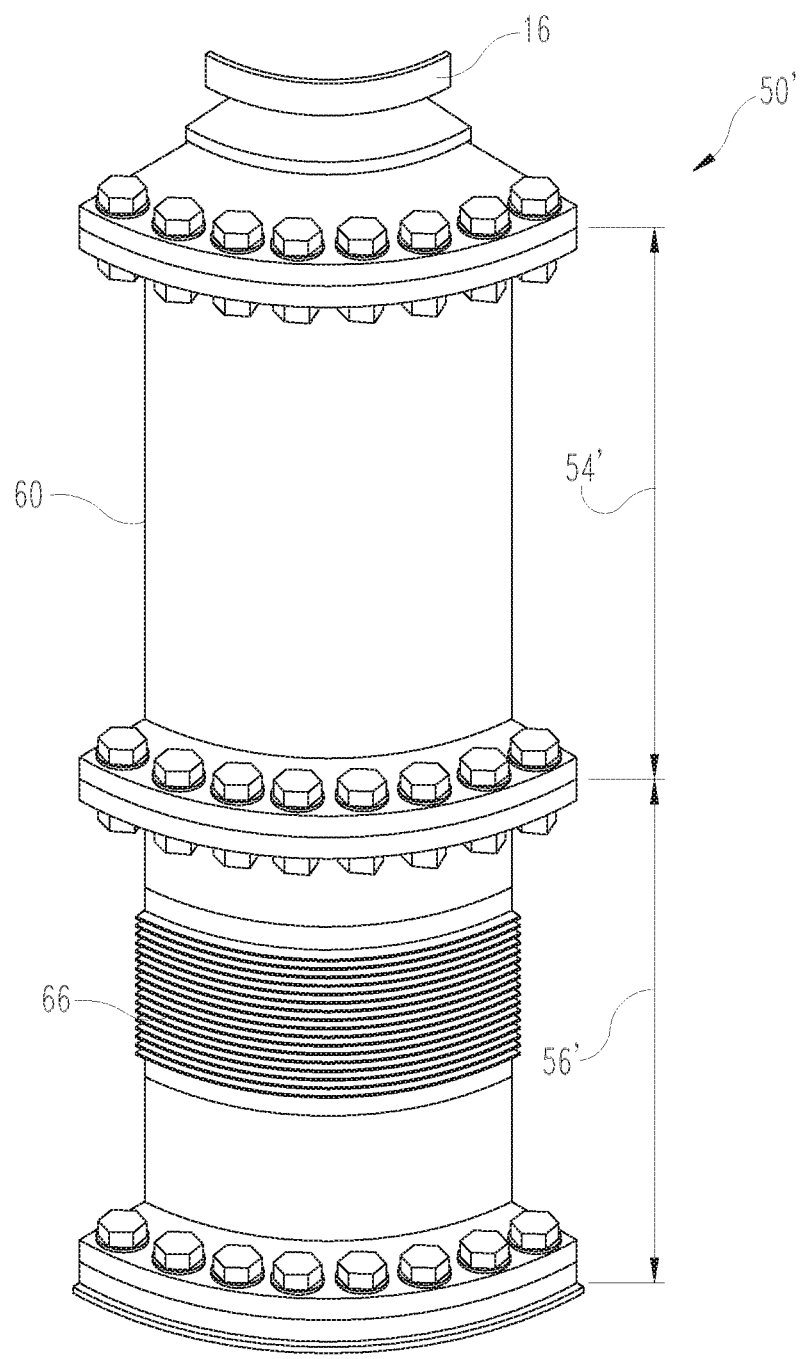
FIG. 4 is a perspective view of a portion of another embodiment bushing turret having an expandable volume.

As shown in FIG. 4, another embodiment turret is provided and designated at 50'. Turret 50' is similar to turret 50, except expandable section 56' is mounted to the tank 12, and the fixed length section 54 extends between and connects the expandable section 56' and bushing 16. Other arrangements are also contemplated. For example, the turret may be provided with more than one expandable section. In another example, the turret may include fixed length sections mounted to the tank and the bushing, and one or more expandable sections between these fixed length sections.

Various aspects of the present disclosure are contemplated. According to one aspect, an apparatus includes a turret. The turret includes a first end mountable to a tank for electrical equipment, a second end mountable to a bushing for insulating at least one conductor connected to the electrical equipment, a volume between the first and second ends for containing a fluid, and at least one section between the first and second ends of the turret that expands in volume in response to a pressure surge in the fluid within the turret to reduce occurrences of ruptures of the turret Various embodiments of the apparatus are also contemplated. For example, the apparatus may include one or more of the following features. The at least one section of the turret may include a bellows that expands in length in response to the pressure surge. The turret may include a fixed length section extending between a first turret flange and a second turret flange, and the bellows may include a corrugated sidewall extending between a first end flange and a second end flange, and one of the first and second end flanges may be mounted to one of the first and second turret flanges.

The bellows may include at least one guide rod extending along the corrugated sidewalls that guide movement of the bellows from a compressed condition to an expanded condition. The at least one guide rod may include a first stop member that contacts a first side of a flange connected to the bellows in the compressed condition of the bellows and a second stop member that contacts a second side of the flange in the expanded condition of the bellows. The at least one guide rod may be fixed to a second flange connected to the bellows. The at least one guide rod may include a plurality of guide rods spaced at equal intervals about the bellows.

The bushing may extend into the volume of the turret. The turret may be made from a first material and the at least one expandable section may be made from a second material that is more ductile than the first material. In another embodiment, the turret and expandable section are made from the same material.

According to another aspect, a transformer system includes a tank including an internal space for housing one or more electrical components and a turret mounted to the tank. The transformer system also includes a bushing mounted to the turret to insulate one or more conductors that receive electrical current from the one or more electrical components. A fluid is provided in the tank and the turret, and the turret is expandable in volume in response to a pressure surge in the fluid in the turret.

Various embodiments of the system are also contemplated. For example, the system may include one or more of the following features. The turret may include a first section that is fixed in length and a second section that is expandable in length in response to the pressure surge.

The turret may include a bellows that expands in response to the pressure surge. The bellows may include a corrugated sidewall extending between a first end flange of the bellows and a second end flange of the bellows.

The first end flange of the bellows may be connected to a bushing flange and the second end flange of the bellows may be connected to a first turret flange of the turret. The turret may include a second turret flange opposite the first turret flange, and the second turret flange may be mounted to the tank.

The first end flange of the bellows may be connected to a first turret flange of the turret and the second end flange of the bellows may be connected to the tank.

The bellows may include at least one guide rod extending along the bellows that guides movement of the bellows from a compressed condition to an expanded condition. The at least one guide rod may include a first stop member that contacts a first side of a first flange connected to the bellows in the compressed condition and a second stop member that contacts a second side of the flange in the expanded condition. The at least one guide rod may be fixed to a second flange connected to the bellows. The at least one guide rod may include a plurality of guide rods spaced at equal intervals about the bellows.

The turret may be mounted to a top wall of the tank. The turret may include a first section made from a first material and a second section made from a second material that is more ductile than the first material and expands in volume in response to the pressure surge. The turret may include a first volume for housing the fluid, the tank may include a second volume for housing the fluid, and the second volume may be substantially greater than the first volume.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus, comprising:
   a turret mountable to a tank for electrical equipment, and further being mountable to at least one bushing for insulating at least one conductor connected to the electrical equipment;
   a volume between first and second ends of the turret for containing a fluid; and
   at least one section between the first and second ends of the turret configured to expand in volume and in length in response to a pressure surge in the fluid within the turret to reduce occurrences of ruptures of the turret.

2. The apparatus of claim 1, wherein the at least one section includes a bellows configured to expand in length in response to the pressure surge.

3. The apparatus of claim 2, wherein the turret includes a fixed length section extending between a first turret flange and a second turret flange,
   wherein the bellows includes a corrugated sidewall extending between a first end flange and a second end flange, and
   wherein one of the first and second end flanges is mounted to one of the first and second turret flanges.

4. The apparatus of claim 3, wherein the bellows includes at least one guide rod extending along the corrugated sidewalls configured to guide movement of the bellows from a compressed condition to an expanded condition.

5. The apparatus of claim 4, wherein the at least one guide rod includes a first stop member configured to contact a first side of a flange connected to the bellows in the compressed condition of the bellows and a second stop member configured to contact a second side of the flange in the expanded condition of the bellows.

6. The apparatus of claim 5, wherein the at least one guide rod is fixed to a second flange connected to the bellows.

7. The apparatus of claim 4, wherein the at least one guide rod includes a plurality of guide rods spaced at equal intervals about the bellows.

8. The apparatus of claim 1, wherein the bushing extends into the volume of the turret.

9. The apparatus of claim 1, wherein the turret is made from a first material and the at least one section is made from a second material that is more ductile than the first material.

10. The apparatus of claim 1, wherein the first end of the turret is mountable to the tank, and the second end of the turret is mountable to the at least one bushing.

11. The apparatus of claim 1, wherein the first end of the turret is configured to be coupled to the bushing,
    wherein the second end of the turret is configured to be coupled to the tank such that an expansion in length of the at least one section causes the bushing to move with respect to the tank, and
    wherein the at least one conductor comprises a flexible conductor configured to be coupled to the bushing such that the flexible conductor remains connected to the electrical equipment.

12. A transformer system, comprising:
    a tank including an internal space for housing one or more electrical components;
    a turret mounted to the tank;
    at least one bushing mounted to the turret to insulate one or more conductors that receive electrical current from the one or more electrical components; and
    a fluid in the tank and the turret, the turret configured to expand in volume in response to a pressure surge in the fluid in the turret, at least a portion of the turret configured to expand in length in response to the pressure surge.

13. The system of claim 12, wherein the turret includes a first section that is fixed in length and a second section comprising a bellows that is configured to expand in length in response to the pressure surge.

14. The system of claim 13, wherein the bellows includes a corrugated sidewall extending between a first end flange of the bellows and a second end flange of the bellows.

15. The system of claim 14, wherein the first end flange of the bellows is connected to a bushing flange and the second end flange of the bellows is connected to a first turret flange of the turret.

16. The system of claim 15, wherein the turret includes a second turret flange opposite the first turret flange, and the second turret flange is mounted to the tank.

17. The system of claim 14, wherein the first end flange of the bellows is connected to a first turret flange of the turret and the second end flange of the bellows is connected to the tank.

18. The system of claim 13, wherein the bellows includes at least one guide rod extending along the bellows configured to guide movement of the bellows from a compressed condition to an expanded condition.

19. The system of claim 18, wherein the at least one guide rod includes a first stop member configured to contact a first side of a first flange connected to the bellows in the compressed condition and a second stop member configured to contact a second side of the flange in the expanded condition.

20. The system of claim 18, wherein the at least one guide rod is fixed to a second flange connected to the bellows.

21. The system of claim 18, wherein the at least one guide rod includes a plurality of guide rods spaced at equal intervals about the bellows.

22. The system of claim 12, wherein the turret is mounted to a top wall of the tank.

23. The system of claim 12, wherein the turret includes a first section made from a first material and a second section made from a second material that is more ductile than the first material and that is configured to expand in volume in response to the pressure surge.

24. The system of claim 12, wherein the turret includes a first volume for housing the fluid,
  wherein the tank includes a second volume for housing the fluid, and
  wherein the second volume is substantially greater than the first volume.

* * * * *